May 13, 1969     R. E. MULLER ET AL     3,443,726

MULTIPLE ELEMENT MIXING AND DISPENSING CONTAINER

Filed Aug. 18, 1967

Inventors

ROBERT E. MULLER, KENT B. GODSTED,
LEON M. PATARINI, and JAMES F. McDONALD

By James T. FitzGibbon

United States Patent Office

3,443,726
Patented May 13, 1969

3,443,726
MULTIPLE ELEMENT MIXING AND DISPENSING CONTAINER
Robert E. Muller, Winnetka, Kent B. Godsted, Dolton, and Leon M. Patarini and James F. McDonald, Chicago, Ill., assignors to National Can Corporation, Chicago, Ill., a corporation of Delaware
Filed Aug. 18, 1967, Ser. No. 661,738
Int. Cl. B67b 7/24; B67d 5/60, 5/06
U.S. Cl. 222—80                            5 Claims

ABSTRACT OF THE DISCLOSURE

A multiple element mixing and dispensing container in which a first can unit, which includes a bottle-receiving threaded collar may be filled with contents and sealed, after which a second element, such as a bottle which includes a threaded neck and a separate dispenser spout, is screwed or locked in a fixed position in the collar so as to seal the bottle, and in which a combination can cap and frangible plug is provided which seals the contents of the two containers from contact with each other until container units are further rotated, whereupon a neck extension or nose on the bottle unit fractures the plug, thereby allowing the contents of the two containers to mix with each other. After the contents are mixed, they are dispensed from the bottle unit, as by squeezing the bottle unit so as to force the liquid through the dispenser valve or spout.

BACKGROUND OF THE INVENTION

Field of the invention

The field of the present invention is that of mixing and dispensing containers which have two or more elements held together in use, but which comprise separate containers, each of which contains a product component which it is not desired to expose to the other component until shortly before it is desired to use the product which results from mixing the contents of the two container elements.

The present invention relates to a combination in which one container element includes a first product and is sealed, but contains a collar to receive and locate a second container element in a desired position. Placing the first container in position on the second container serves to seal the second container, and, since the first container plug or seal remains in place, also from the contents of the first container.

When it is desired to mix and dispense the contents of the two containers, it is only necessary to advance a neck or like portion of the second container upwardly or downwardly to knock out a scored portion of the sealing plug which serves to seal the first container, thereby exposing the contents of each container to the contents of the other. A dispensing spout is provided on one container or the other for dispensing the mixed contents. Thus, the field of the invention is generally that of separately fillable containers which are packaged and sold as a unit, but which contain separate products to be kept separate until it is desired to mix them just prior to dispensing, and particularly that of containers in which a sealing plug located between two separable containers serves to seal both containers, but may be broken so as to provide a communicating passage between the two containers, and in which breaking is accomplished by twisting the containers relative to each other, or otherwise placing a rupturing force on the frangible portion of the sealing plug.

Description of the prior art

It is very common today in the cosmetic field, and particularly in the field of womens' hair care, to apply various bleaching or dyeing preparations to the hair. These preparations are in great demand because of their relative safety and reliability, and because esthetically pleasing results can be obtained with them at fairly low cost.

However, although these preparations are reliable in use, they are made from ingredients which react with each other and are relatively unstable from a chemical standpoint. Typical ingredients of these bleaches or colorants or other preparations are various peroxides, permanganates and other strong oxidizers as well as other acids and bases which attack materials from which many containers are commonly made.

When these products are mixed with each other a certain amount of neutralization takes place whereby the product is physically safe and relatively harmless. However, storage of the components has presented considerable problems, and in the case of certain preparations which are widely accepted, it is absolutely necessary to keep the two components separate from each other until just before the time of use. Thus, although convenient in many ways compared to older styles of hair treatment operations, very serious drawbacks to safe and efficient operation, and to convenience for home application are presented in today's packages by reason of the fact that the user or operator must mix these chemically strong ingredients by pouring or squeezing the contents of one container into another, and then sealing the container and agitating it before dispensing the mixed contents therefrom.

SUMMARY OF THE INVENTION

In view of the shortcomings of the prior art, and in view of the large numbers of such preparations which are sold today there is a great demand for an improved package for hair coloring or bleaching preparations, or the like, in which two components, which are desired to be mixed later, but which must first be kept separate from each other, may be contained, and in which the container may be safely shipped and attractively merchandised as single unit. There is also a demand for such a container which is capable of being simply manipulated to establish a communicating passage between two separate, product-containing chambers or compartments thereof.

Accordingly, an object of the present invention is to provide a container having a first element and a second element, in which the two elements each contain a separate product and are separated from each other by a frangible plug.

Another object is to provide a container in which relative motion of one container toward the other serves to fracture the plug for mixing the product contained in the two elements.

A further object is to provide a container which includes dispenser means in one element thereof for dispensing a mixed product resulting from fracturing an inner seal separating the two containers, and thereafter mixing the contents of both containers.

Another object is to provide a container which includes means for causing one part of one element to pierce a plug member when the containers are rotated or otherwise manipulated with respect to each other.

An additional object is to provide a two element container which includes means for preventing accidental relative motion between the two elements of the container, or for enabling a consumer to detect whether such tampering motion has occurred.

The invention overcomes the prior art shortcomings and achieves its objects by providing a first container element, a frangible plug sealing an opening in said first container element, collar means surrounding said opening and adapted to receive the neck or like portion of a second container element, a second container element, including neck means thereon adapted to be disposed at least partially within said collar, said collar and neck including cooperating means for allowing a portion of said second element to pierce said plug means, whereby a mixing passage is established between said first and second container elements.

The manner in which the above stated objects and advantages of the invention are attained and will become more apparent when considered in conjunction with the description of the preferred embodiments of the invention set forth in the specification, and as shown in the drawings, in which like reference numerals denote corresponding parts throughout.

DESCRIPTION OF THE PREFERRED EMBODIMENTS

Figure 1:
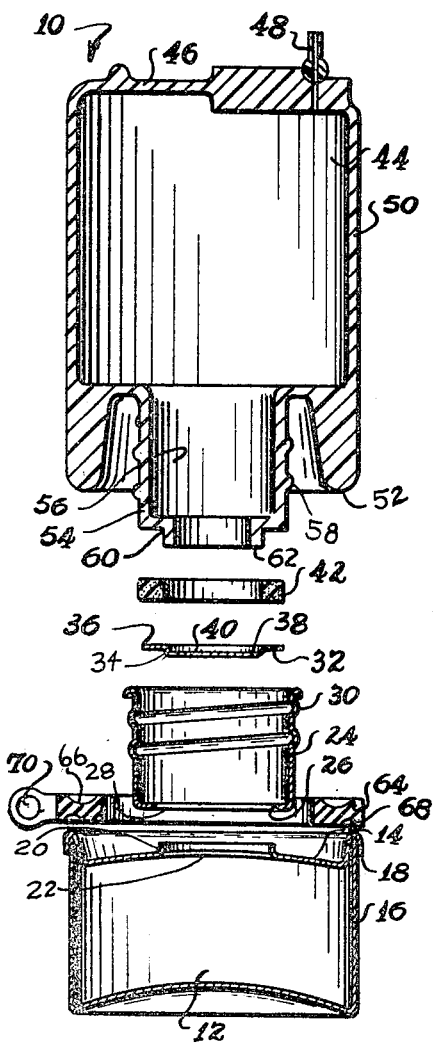
FIG. 1 is an exploded vertical sectional view of the multiple element mixing and dispensing container of the present invention, shown before assembly and filling thereof.

As used herein, expressions such as "upper," "lower," or the like, denoting positions and spatial relations are taken only to mean such positions or relations as shown in the drawings and are for purposes of illustration only, since the container element of the invention does not depend for its operation of any particular position or orientation.

Likewise, when referring to the elements, or components thereof as being made from different materials, it will be understood that the elements may be made from similar materials having differing coatings or interiors, since some of the products used with the invention are deleterious to various container or coating materials. In some cases, it is desired to have separate containers merely for the purpose of keeping the contents separated from each other, and in such cases, the use of different materials is optional.

Referring now to the drawings in greater detail, FIG. 1 shows a multiple element mixing and dispensing container 10 as comprising a lower, first can unit 12 which includes a top 14 attached to side walls 16 by crimped seam 18. If desired, a conventional double seam, well known in the can making art, may be used to join the top 14 and the side wall 16. A circular vertical flange 20 defines an opening 22 in the bottom can 12.

Surmounting the lower can 12 is a metal collar 24 in which an inwardly directed flange 26 defines an opening 28. Rolled threads 30 are included in the collar 24. A combination so-called single friction type can cap and frangible plug 32 is provided, which includes an outer friction or sealing surface 34 an outwardly extending locking flange 36, and a score line 38 defining a removable center section 40. Surmounting the combination cap and plug 32 is a sealing ring or washer 42, preferably made of a resilient material.

The upper container element comprises, for example, a plastic bottle 44 having a top surface 46, and a dispensing outlet closure 48. The closure 48 is not an essential part of the invention, but is advantageously used therewith, and this unit may be a closure such as that described in the Gustafson U.S. Patent No. 3,023,939, issued Mar. 6, 1962.

The upper element 44 also includes side walls 50 terminating in a shoulder 52, and a neck 54 defining a product passage 56. The neck 54 includes thread means 58 on the outside thereof, a sealing shoulder 60 and a neck extension 62. The two sets of thread means 30, 58 cooperate with each other, whereby rotation of the elements 12, 44 relative to each other will cause downward motion of the neck extension 62.

A tamper proof ring element 64 includes a top trough 66 which is formed with the contours of the bottom of the neck 52 therein, a lower trough 68, having the contours of seam 18, and a finger tab 70 attached thereto. The ring 64 is made of a rubber or plastic material which is suitably selected so as to be resilient enough to be pulled out from the space separating the seam 18 from the shoulder 52, but stiff enough to prevent substantial downward movement of the shoulder a distance sufficient enough to allow the neck extension 62 to knock out the plug 40 from the cap and plug unit 32. The ring 64 is preferably constructed as a ring but with a slit 72 therein so that it may be completely removed from its position encircling the collar 24.

Figure 2:
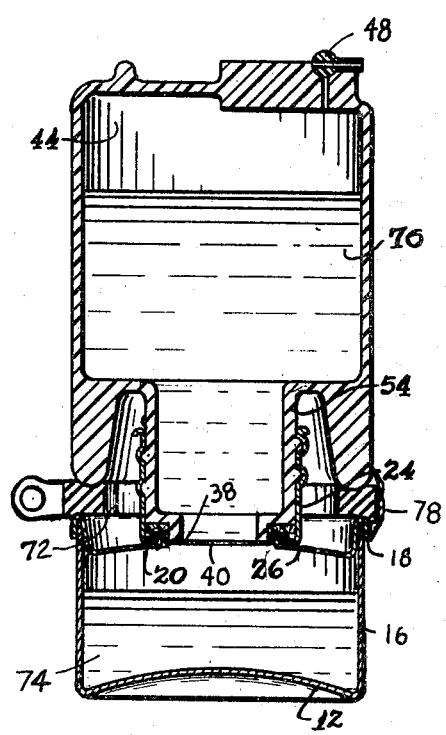
FIG. 2 is a vertical sectional view of the container of the present invention, shown in its assembled form with contents therein.
Figure 3:
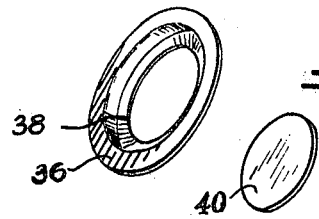
FIG. 3 is an exploded isometric view of the frangible plug which seals the passage between the two elements of the container.

FIG. 2 shows an assembled view of the container, wherein it is shown that the flange 20 of the container 12 has been folded outwardly over the flange 26 of the collar 24, thereby attaching the collar 24 to the can 12 and providing a ledge portion which is adapted to mate with the sealing surface 34 of the combination can cap and frangible plug 32.

In use, when the flange 20 has been crimped into the position shown in FIG. 2, securing the collar 24 to the can 12, a first product 74 is added to the can 12. Thereafter, the plug 32 is inserted and pressed into place, sealing the passage 22 and preventing escape of the contents 74.

Next, it is preferred to invert the container 44 with respect to the position shown in FIGS. 1 and 2 and fill it with a second product 76, through the large passage 56 defined by the neck 54. Thereupon, the washer 42 is fitted in place over the shoulder 60, and the container collar 24 of the container element 12 is screwed over the neck 54 of the container 44, which is so constructed and arranged that the washer 42 is somewhat compressed between the flange 36 and the shoulder 60, so that the contents 76 are sealed in place, but not so snugly so as to prevent further movement of the neck extension 62 toward the plug 32.

FIG. 2 shows the use of a sealing tape 78 covering portions of the seam 18 and the neck 52 and adapted to display a twisted or fractured appearance to a consumer if the elements 12, 44 have been rotated with respect to each other after packaging thereof.

When the two containers are filled and attached to each other as described above, the ring 64 or tape 78 is then put in place and the container may be stored and displayed as shown in FIG. 2.

When the consumer desires to use the contents of the package, all that is required is removing the ring 64 or tape 78, and rotating the elements 12, 44, relative to each other. This causes the nose or neck extension 62 of the neck 58 to rotate downwardly in threads 30 and push the central knock-out portion 40 of the plug 32 downwardly into the container 12, thereby opening the passageways 22, 56 to each other, and allowing the contents to be mixed. Shaking or inverting the containers one or more times will aid in mixing the contents, and thereafter, the closure 48 may be opened to dispense the mixed product directly to the desired place of application.

If the dispenser or applicator 48 is not included, the package is arranged so that all the contents may be held in one or the other of the container elements, and poured from the passages provided by separating the containers.

In a preferred embodiment for hair colorants, one component may be satisfactorily packaged only in aluminum, and the other may be contained in a bottle made of plastic, such as polyethylene. In this case, the container 12 which may be a drawn or extruded can, is made from aluminum with an aluminum plug 32. The container 44 is polyethylene and the thickness of the neck extension of the nose 52 and the neck 54 is sufficient enough to provide strength for knocking out the center section 40 from the friction plug 32. The score line 38 in the plug 32 is deep enough to leave a residual thickness of between 0.002 and 0.008 inch of aluminum, With such a construction, the center 40 may be readily knocked out of the plug 32, because of the leverage afforded by the outside diameter of the bottle, and the provision of the thread means, whereas the residual thickness of the aluminum is strong enough to withstand accidental damage in shipping or handling.

Materials to be used in the present invention depend on the products to be contained in the elements. As illustrated in the preferred embodiment, such materials may be different materials such as the aluminum and plastic described, or they may be the same, as by making both elements from plastic, glass, or metal. A further advantage of the illustrated embodiment, namely one in which the element 44 which includes the dispenser 48 is made from a flexible material, is that this construction makes it easy to dispense the liquid through the closure 48 merely by squeezing the flexible element 44.

Likewise, the construction of the ring or tape means for keeping the elements separate are not particularly critical, but may be suitably selected by those skilled in the art. The embodiment has been described in which most of the principal components are separately formed, such as the washer, the plug, the collar, etc., but it is known to those skilled in the art to combine one or more of these elements or to make one or more combined elements from separate parts.

Although the embodiment illustrated is suitable for two liquids, it should be understood that the invention is suitable for use where it is desired to mix a liquid with a powder or like solid material.

We claim:
1. A multiple element container, comprising in combination,
   a first container element having a first fluid contained therein,
      said first container element having bottom, top and side wall portions,
      said top wall portion having an opening therethrough,
   a collar surrounding said opening and attached to said top wall portion so as to present a ledge portion inwardly of said collar and contiguous with the periphery of said opening,
      said collar having means adapted for receipt of the neck of a second container element,
      said ledge portion adapted for the receipt of a plug for sealing said opening,
         said plug means having a knock out portion therein adapted to be fractured and pushed out, said knock out portion being defined by a line of weakness in the material comprising said plug,
   a second container element having a second fluid contained therein,
      said second container element having a neck portion adapted for receipt by said collar so as to attach said container elements in liquid tight relation,
      said neck portion further including a forward portion thereof for engagement with said knock out portion,
   whereby relative movement of a predetermined axial distance between the two container elements towards each other causes removal of the knock out portion by increased engagement with said forward end of the neck portion thereby interconnecting the interior portions of both container elements and permitting the mixing of said first and second fluids contained therein.

2. The structure as set forth in claim 1 wherein separate sealing means is providing between said ledge portion and said second container element neck portion.

3. A multiple element container, comprising in combination,
   a first container element having a first fluid contained therein,
      said first container element having bottom, top and side wall portions,
      said top wall portion having a circular flange defining an opening through said top wall portion,
   a collar surrounding said opening and terminating in a flange portion at the lower end thereof,
      said collar having means adapted for receipt of the neck of a second container element,
      both said flanges being clinched together thereby attaching said collar to said top wall portion,
      said clinched flanges further presenting a ledge portion positioned inwardly of said collar and contiguous with the periphery of said opening,
      said ledge portion adapted for the receipt of a plug for sealing said opening,
         said plug means having a knock out portion therein adapted to be fractured and pushed out, said knock out portion being defined by a line of weakness in the material comprising said plug,
   a second container element having a second fluid contained therein,
      said second container element having a neck portion adapted for receipt by said collar so as to attach said container elements in liquid tight relations,
      said neck portion further including a forward portion thereof for engagement with said knock out portion,
   whereby relative movement of a predetermined axial distance between the two container elements towards each other causes removal of the knock out portion by increased engagement with said forward end of the neck portion thereby interconnecting the interior portions of both container elements and permitting the mixing of said first and second fluids contained therein.

4. The structure as set forth in claim 3 wherein separate sealing means is provided between said ledge portion and said second element neck portion.

5. The structure as set out in claim 4 wherein said separate sealing means is a compressible washer having an opening through which said forward portion of said neck projects and wherein said neck includes a shoulder portion in sealing engagement with said washer.

References Cited

UNITED STATES PATENTS

| | | | |
|---|---|---|---|
| 1,731,847 | 10/1929 | Eckart | 206—47 |
| 1,773,263 | 8/1930 | Dister | 222—541 |
| 3,207,374 | 9/1965 | Holmes et al. | 222—80 |
| 3,318,494 | 5/1967 | Porter et al. | 222—541 |

FOREIGN PATENTS

| | | |
|---|---|---|
| 1,136,793 | 1/1957 | France. |
| 303,806 | 1/1930 | Great Britain. |

W. SOBIN, *Primary Examiner.*

U.S. Cl. X.R.

206—47; 222—145, 153, 531, 541